United States Patent
Iwamoto

(10) Patent No.: US 10,323,968 B2
(45) Date of Patent: Jun. 18, 2019

(54) METHOD OF RECORDING PHYSICAL QUANTITY CHANGE HISTORY, PROGRAM THEREOF, FLOW RATE MEASUREMENT APPARATUS AND FLUID SUPPLYING SYSTEM

(75) Inventor: Ryuji Iwamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 971 days.

(21) Appl. No.: 12/602,325

(22) PCT Filed: May 26, 2008

(86) PCT No.: PCT/JP2008/001309
§ 371 (c)(1),
(2), (4) Date: Jun. 23, 2010

(87) PCT Pub. No.: WO2008/146484
PCT Pub. Date: Dec. 4, 2008

(65) Prior Publication Data
US 2010/0292940 A1    Nov. 18, 2010

(30) Foreign Application Priority Data

May 28, 2007 (JP) ............................ 2007-141167
May 28, 2007 (JP) ............................ 2007-141168

(51) Int. Cl.
*G01D 4/00* (2006.01)
*G01F 1/66* (2006.01)
(Continued)

(52) U.S. Cl.
CPC .......... *G01F 15/068* (2013.01); *G01D 4/002* (2013.01); *G01F 1/66* (2013.01); *G01F 15/002* (2013.01);
(Continued)

(58) Field of Classification Search
USPC ......... 702/45, 50, 79, 100, 176, 187; 73/861
See application file for complete search history.

(56) References Cited

U.S. PATENT DOCUMENTS 5,675,504 A * 10/1997 Serodes et al. ............... 702/25
2005/0171682 A1 * 8/2005 Adachi ........................ 701/117
(Continued)

FOREIGN PATENT DOCUMENTS

JP    61-264229 A    11/1986
JP    09-079870 A    3/1997
(Continued)

OTHER PUBLICATIONS

International Search Report for International Application No. PCT/JP2008/001309, dated Jul. 15, 2008, 2 pages.

*Primary Examiner* — Manuel A Rivera Vargas
*Assistant Examiner* — Yaritza H Perez Bermudez
(74) *Attorney, Agent, or Firm* — Brinks Gilson & Lione

(57) ABSTRACT

When an appliance identification art is provided, the computing speed and the identification accuracy are improved while the required memory amount, etc., is decreased. In a gas meter 100, an ultrasonic flowmeter 104 measures the flow rate of gas flowing into a flow path 102 at a given time interval, and a computation section 108 computes a difference value of the predetermined time period between the measured flow rates. A difference value conversion section 112 converts the computed difference value into a code with reference to a flow rate class table by which classes of difference values corresponding to a size of the difference value and codes representing the classes are associated with each other. Further, a flow rate change history generation section 114 generates a flow rate change history approximately representing flow rate change of gas based on a set of the codes of the predetermined time period.

14 Claims, 7 Drawing Sheets

(51) Int. Cl.
    *G01F 15/00*     (2006.01)
    *G01F 15/06*     (2006.01)
    *G01F 1/00*     (2006.01)

(52) U.S. Cl.
    CPC .............. *Y02B 90/241* (2013.01); *Y04S 20/32* (2013.01); *Y04S 20/38* (2013.01)

(56) References Cited

U.S. PATENT DOCUMENTS

| | | | |
|---|---|---|---|
| 2007/0192046 A1* | 8/2007 | Hairston | 702/45 |
| 2008/0270045 A1 | 10/2008 | Miyata et al. | |
| 2009/0248213 A1* | 10/2009 | Gotoh | 700/282 |
| 2009/0271128 A1* | 10/2009 | Umekage et al. | 702/45 |

FOREIGN PATENT DOCUMENTS

| | | | |
|---|---|---|---|
| JP | 2000-283815 A | | 10/2000 |
| JP | 2005-321197 A | | 11/2005 |
| JP | 2006-038630 A | | 2/2006 |
| JP | 2006038630 A | * | 2/2006 |
| JP | 2006-313114 A | | 11/2006 |
| JP | 2006313114 A | * | 11/2006 |
| JP | 2007-024807 A | | 2/2007 |
| TW | 200819713 A | * | 5/2008 |
| WO | WO 2008050490 A1 | * | 5/2008 |

* cited by examiner

FIG. 2

| ABSOLUTE FLOW RATE Q(n) | DIFFERENCE FLOW RATE ΔQ | CODE N1 | |
|---|---|---|---|
| | LARGER THAN 150L/h | 7 | ⎫ |
| | 150L/h ≧ ΔQ > 100L/h | 6 | ⎬ INCREASE AREA |
| | 100L/h ≧ ΔQ > 50L/h | 5 | |
| | 50L/h ≧ ΔQ > 10L/h | 4 | ⎭ |
| | 10L/h ≧ ΔQ > 1L/h | 3 | ⎫ |
| Q(n)≠0 | 1L/h ≧ ΔQ > 0.5L/h | 2 | |
| | 0.5L/h ≧ ΔQ > 0L/h | 1 | |
| | 0L/h | 8 | ⎬ STABLE AREA |
| | 0L/h > ΔQ ≧ −0.5L/h | 9 | |
| | −0.5L/h > ΔQ ≧ −1L/h | A | |
| | −1L/h > ΔQ ≧ −10L/h | B | ⎭ |
| | −10L/h > ΔQ ≧ −50L/h | C | ⎫ |
| | −50L/h > ΔQ ≧ −100L/h | D | ⎬ DECREASE AREA |
| | −100L/h > ΔQ ≧ −150L/h | E | |
| | SMALLER THAN −150L/h | F | ⎭ |
| Q(n)=0 | | 0 | AREA WHERE FLOW RATE IS 0 |

| CODE N2 | |
|---|---|
| 1 | INCREASE AREA |
| 3 | STABLE AREA |
| 2 | DECREASE AREA |
| 0 | AREA WHERE FLOW RATE IS 0 |

| FLOW RATE VALUE Q (n) | DIFFEREN-CE VALUE Δ2 SEC | 16 CLASSES CODE N1 | 4 CLASSES CODE N2 |
|---|---|---|---|
| 0 | 0 | 0 | 0 |
| 60 | 60 | 5 | 1 |
| 120 | 60 | 5 | 1 |
| 123 | 3 | 3 | 3 |
| 140 | 17 | 4 | 1 |
| 160 | 20 | 4 | 1 |
| 165 | 5 | 3 | 3 |
| 167 | 2 | 3 | 3 |
| 166 | −1 | A | 3 |
| 166 | 0 | 1 | 3 |

| FLOW RATE VALUE | DIFFEREN-CE VALUE | 16 CLASSES | 4 CLASSES |
|---|---|---|---|
| Q (n) | Δ2 SEC | CODE N1 | CODE N2 |
| 0 | 0 | 0 | 0 |
| 230 | 230 | 7 | 1 |
| 450 | 220 | 7 | 1 |
| 600 | 150 | 7 | 1 |
| 640 | 40 | 4 | 1 |
| 630 | −10 | B | 3 |
| 620 | −10 | B | 3 |
| 625 | 5 | 3 | 3 |
| 624 | −1 | A | 3 |
| 622 | −2 | B | 3 |

FIG. 5

| ABSOLUTE FLOW RATE Q(n) | DIFFERENCE FLOW RATE ΔQ | CODE N1 | |
|---|---|---|---|
| Q(n)≠0 | LARGER THAN 30L/h | 7 | INCREASE AREA |
| | 30L/h ≧ ΔQ > 20L/h | 6 | |
| | 20L/h ≧ ΔQ > 15L/h | 5 | |
| | 15L/h ≧ ΔQ > 10L/h | 4 | |
| | 10L/h ≧ ΔQ > 1L/h | 3 | STABLE AREA |
| | 1L/h ≧ ΔQ > 0.5L/h | 2 | |
| | 0.5L/h ≧ ΔQ > 0L/h | 1 | |
| | 0L/h | 8 | |
| | 0L/h > ΔQ ≧ −0.5L/h | 9 | |
| | −0.5L/h > ΔQ ≧ −1L/h | A | |
| | −1L/h > ΔQ ≧ −10L/h | B | |
| | −10L/h > ΔQ ≧ −15L/h | C | DECREASE AREA |
| | −15L/h > ΔQ ≧ −20L/h | D | |
| | −20L/h > ΔQ ≧ −30L/h | E | |
| | SMALLER THAN −30L/h | F | |
| Q(n)=0 | | 0 | AREA WHERE FLOW RATE IS 0 |

| CODE N2 | |
|---|---|
| 1 | INCREASE AREA |
| 3 | STABLE AREA |
| 2 | DECREASE AREA |
| 0 | AREA WHERE FLOW RATE IS 0 |

FIG. 6

| ABSOLUTE FLOW RATE Q(n) | DIFFERENCE FLOW RATE ΔQ | CODE N1 | | CODE N2 | |
|---|---|---|---|---|---|
| Q(n) ≠ 0 | ΔQ > 900L/h | F | INCREASE AREA | 1 | INCREASE AREA |
| | 900L/h ≧ ΔQ > 800L/h | E | | | |
| | 800L/h ≧ ΔQ > 700L/h | D | | | |
| | 700L/h ≧ ΔQ > 600L/h | C | | | |
| | 600L/h ≧ ΔQ > 500L/h | B | | | |
| | 500L/h ≧ ΔQ > 400L/h | A | | | |
| | 400L/h ≧ ΔQ > 300L/h | 9 | | | |
| | 300L/h ≧ ΔQ > 200L/h | 8 | | | |
| | 200L/h ≧ ΔQ > 150L/h | 7 | | | |
| | 150L/h ≧ ΔQ > 100L/h | 6 | | | |
| | 100L/h ≧ ΔQ > 50L/h | 5 | | | |
| | 50L/h ≧ ΔQ > 10L/h | 4 | | | |
| | 10L/h ≧ ΔQ > 1L/h | 3 | STABLE AREA | 3 | STABLE AREA (INCREASE SIDE) |
| | 1L/h ≧ ΔQ > 0.5L/h | 2 | | | |
| | 0.5L/h ≧ ΔQ > 0L/h | 1 | | | |
| | 0L/h | 0 | | | |
| | 0L/h > ΔQ ≧ -0.5L/h | 1 | | 4 | STABLE AREA (DECREASE SIDE) |
| | -0.5L/h > ΔQ ≧ -1L/h | 2 | | | |
| | -1L/h > ΔQ ≧ -10L/h | 3 | | | |
| | -10L/h > ΔQ ≧ -50L/h | 4 | DECREASE AREA | 2 | DECREASE AREA |
| | -50L/h > ΔQ ≧ -100L/h | 5 | | | |
| | -100L/h > ΔQ ≧ -150L/h | 6 | | | |
| | -150L/h > ΔQ ≧ -200L/h | 7 | | | |
| | -200L/h > ΔQ ≧ -300L/h | 8 | | | |
| | -300L/h > ΔQ ≧ -400L/h | 9 | | | |
| | -400L/h > ΔQ ≧ -500L/h | A | | | |
| | -500L/h > ΔQ ≧ -600L/h | B | | | |
| | -600L/h > ΔQ ≧ -700L/h | C | | | |
| | -700L/h > ΔQ ≧ -800L/h | D | | | |
| | -800L/h > ΔQ ≧ -900L/h | E | | | |
| | -900L/h > ΔQ | F | | | |
| Q(n) = 0 | | 0 | AREA WHERE FLOW RATE IS 0 | 0 | AREA WHERE FLOW RATE IS 0 |

METHOD OF RECORDING PHYSICAL QUANTITY CHANGE HISTORY, PROGRAM THEREOF, FLOW RATE MEASUREMENT APPARATUS AND FLUID SUPPLYING SYSTEM

This application is a 371 application of PCT/JP2008/001309 having the international filing date of May 26, 2008, which claims priority to JP 2007-141167 filed May 28, 2007 and JP 2007-141168 filed May 28, 2007, the entire contents of which are incorporated herein by reference.

BACKGROUND OF THE INVENTION

1. Field of the Invention

This invention relates to an art for correctly identifying a phenomenon by catching a change of the physical quantity like the flow rate of a fluid.

2. Description of the Related Art

Hitherto, for example, a gas meter has been available as an apparatus for catching a change of the physical quantity and identifying a phenomenon. Patent document 1 describes a gas meter for identifying a working appliance in a fluid piping system having the gas meter. A gas meter 1 in the document has a flow rate measurement unit 3 being placed in a flow path 6 connected to a household gas supplying pipe for measuring the gas flow rate at given time intervals, a computation unit 4 for finding the difference value between the flow rate values output from the flow rate measurement unit 3, and a comparison and determination unit 7 for making a comparison between the difference value calculated by the computation unit 4 and a change determination value registered in a storage unit 5 and determining a change of the working state of each gas appliance, as shown in FIG. 7. The computation unit 4, the comparison and determination unit 7, and a gas shut-off valve 2 are controlled by a control circuit 8.

In the gas meter 1 described above, a change of the difference value between the instantaneous flow rates output from the flow rate measurement unit 3 is computed sequentially and a change of the working state of the gas appliance is identified according to the change amount; the registered data and the measured gas flow rate change (difference value) are compared with each other and identification of working gas appliances 13, 14, and 15 is made possible.

Patent document 1: Japanese Patent Publication No. 2006-313114A

PROBLEMS TO BE SOLVED BY THE INVENTION

In the configuration described above, since the difference values are directly used for the identification, basically the identification can be performed only in a limited time period and thus it is hard to say that the appliance identification accuracy is sufficient; on the other hand, if the identification is attempted based on the whole of the flow rate values measured over the long term, it takes time in identifying the gas appliance and the necessary memory amount, etc., becomes enormous.

The invention is embodied for solving the problems described above and it is an object of the invention to improve the computing speed and the identification accuracy while decreasing the memory amount required for computations, etc., by simplifying the computations.

SUMMARY OF THE INVENTION

Means For Solving the Problems

A method of recording a physical quantity change history according to the invention includes the steps of measuring a physical quantity at a given time interval; computing a difference value of the predetermined time period between the measured physical quantities; converting the computed difference value into a code with reference to a physical quantity class table by which classes of difference values corresponding to a size of the difference value and codes representing the classes are associated with each other; and generating an artificial physical quantity waveform pattern approximately representing physical quantity change of fluid based on a set of the codes of the predetermined time period.

According to the invention, a code provided by coding (converting) the difference value between the physical quantities is used. Therefore, computations are simplified and it is made possible to improve the computing speed and the identification accuracy while decreasing the memory amount required for the computations, etc.

In the method of recording the physical quantity change history according to the invention, the classes in the physical quantity class table are grouped into four events of an area where it is determined that the physical quantity is zero, an area where it is determined that the physical quantity is stable, an area where it is determined that the physical quantity increases, and an area where it is determined that the physical quantity decreases; the number of classes may be set to the number in units of any number of bits, such as "4" for classifying into four events or "16" for subdividing each of the areas and classifying in response to the physical quantity stability, degree of the physical quantity increase, and degree of the physical quantity decrease, and it is made possible to improve the computing speed and the identification accuracy while decreasing the memory amount required for the computations, etc. The physical quantity class table having the number of classes, 16 and the physical quantity class table having the number of classes is 4 may be switched as required. According to the composition, the appropriate physical quantity class table can be used in response to a scene.

Further, the invention provides a program for executing the method of recording the physical quantity change history.

A flow rate measurement apparatus of the invention includes a flow rate measurement section for measuring the flow rate of a fluid flowing into a flow path at a given time interval; a computation section for computing a difference value of the predetermined time period between the flow rates measured by the flow rate measurement section; a flow rate class table by which classes of difference values corresponding to a size of the difference value and codes representing the classes are associated with each other; a difference value conversion section for converting the difference value computed by the computation section into the code with reference to the flow rate class table; and a flow rate change history generation section for generating a flow rate change history approximately representing flow rate change of fluid based on a set of the codes of the predetermined time period provided by the difference value conversion section.

According to the invention, to identify the use apparatus of the fluid, code provided by coding (converting) the difference value between the flow rates is used. Therefore, computations are simplified and it is made possible to improve the computing speed and the appliance identification accuracy while decreasing the memory amount required for the computations, etc.

In the flow rate measurement apparatus of the invention, the classes in the flow rate class table are grouped into four events of an area where it is determined that the flow rate is zero, an area where it is determined that the flow rate is stable, an area where it is determined that the flow rate increases, and an area where it is determined that the flow rate decreases; the number of classes may be set to the number in units of any number of bits, such as "4" for classifying into four events or "16" for subdividing each of the areas and classifying in response to the flow rate stability, degree of the flow rate increase, and degree of the flow rate decrease, and it is made possible to improve the computing speed and the appliance identification accuracy while decreasing the memory amount required for the computations, etc. The flow rate class table having the number of classes, 16 and the flow rate class table having the number of classes, 4 may be switched as required. According to the composition, the appropriate flow rate class table can be used in response to a scene.

Advantages of the Invention

According to the invention, to provide the art relating to phenomenon identification and appliance identification, it is made possible to improve the computing speed and the identification accuracy while decreasing the required memory amount, current consumption of a microcomputer, etc.

BRIEF DESCRIPTION OF THE DRAWINGS

FIG. 2 is a drawing to show an example of a flow rate class table.

FIG. 5 is a drawing to show another example of a flow rate class table.

FIG. 6 is a drawing to show still another example of a flow rate class table.

DETAILED DESCRIPTION OF THE PREFERRED EMBODIMENTS

Best Mode for Carrying out the Invention

An embodiment of the invention will be discussed with reference to the accompanying drawings.

Figure 1:
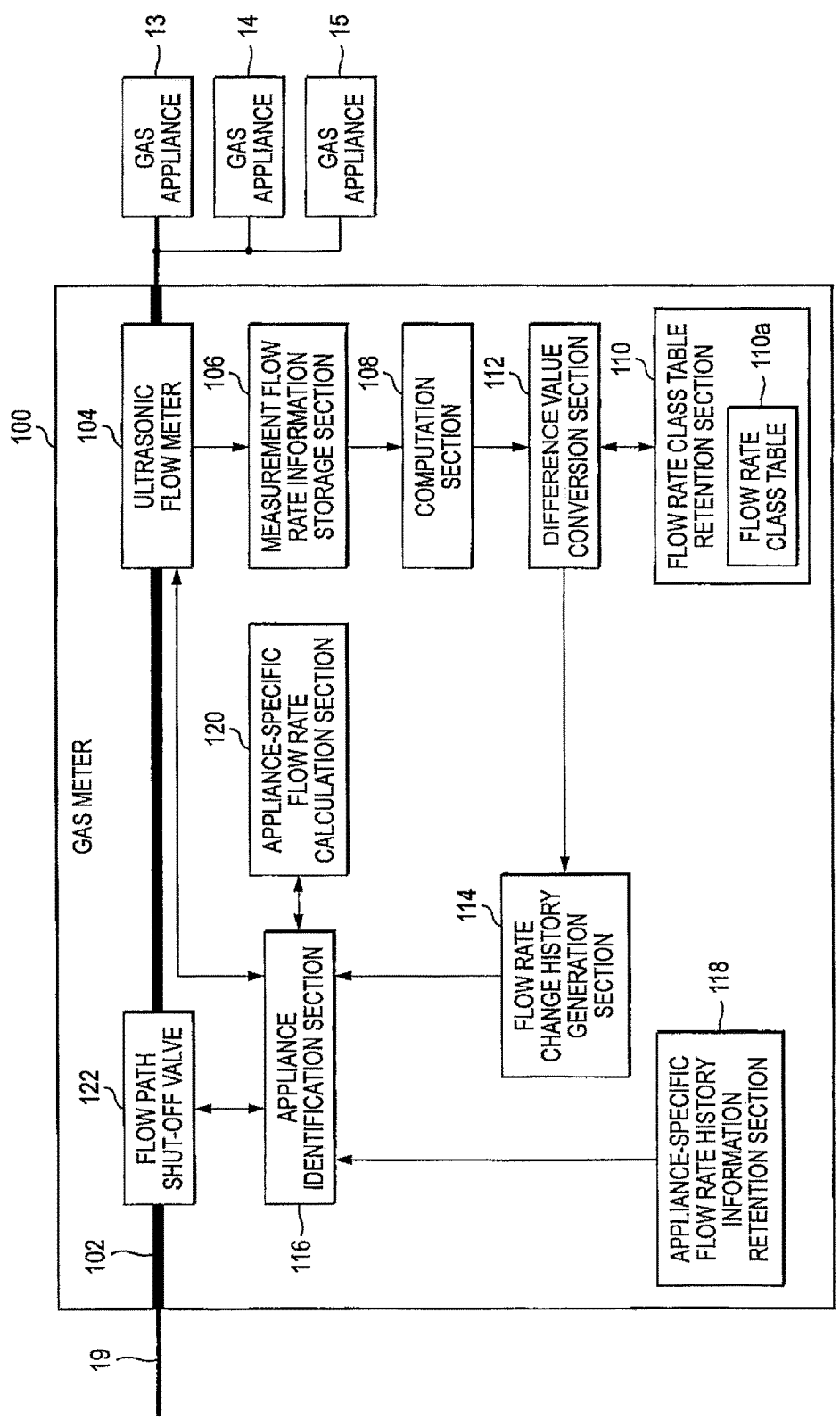
FIG. 1 is a block diagram of a gas meter in an embodiment of the invention.

FIG. 1 is a block diagram of a gas meter as a flow rate measurement apparatus (physical quantity measurement apparatus) in the embodiment of the invention.

In FIG. 1, a gas meter 100 includes a flow path 102, an ultrasonic flowmeter 104 as a flow rate measurement section, a measurement flow rate information storage section 106, a computation section 108, a flow rate class table retention section 110, a difference value conversion section 112, a flow rate change history generation section 114, an appliance identification section 116, and an appliance-specific flow rate history information retention section 118. The gas meter 100 further includes a flow path shut-off valve 122 placed on the flow path 102 for shutting off gas in an emergency, etc.

The ultrasonic flowmeter 104 transmits an ultrasonic wave to gas as a fluid flowing into the flow path 102 at a given time interval (for example, two seconds, etc.,) and measures the flow rate of the gas, and a general flowmeter can be used. The measurement flow rate information storage section 106 stores target data described by associating the measurement flow rate value measured in the ultrasonic flowmeter 104 and the measurement time at which the measurement flow rate value has been measured with each other.

The computation section 108 computes the difference value of a predetermined time period corresponding to the above-described ultrasonic wave transmission interval, between the gas flow rates measured by the ultrasonic flowmeter 104. For example, if the flow rate (actual flow rate) at a given timing is 60 L/h (liters per hour) and the flow rate at the next timing is 120 L/h in FIG. 3 described later, the difference value at this time is computed as 120−60=60 (L/h). The difference value computation may be performed based on the flow rate at the timing after the next (the flow rate next to the flow rate 120 L/h).

The flow rate class table retention section 110 retains a flow rate class table 110a by which classes of difference values corresponding to a size of the difference value and codes representing the classes are associated with each other, as shown in FIG. 2. The flow rate class table 110a acts as a conversion table for classifying the measured difference values into predetermined classes and converting each class into the code representing the class. The number of classes in the flow rate class table 110a is not limited; two types of 16 (N1) and 4 (N2) are provided in FIG. 2. That is, the gas meter 100 can be used by appropriately switching between a flow rate class table where the number of classes is 16 and a flow rate class table where the number of classes is 4.

As shown in FIG. 2, two types of classes represented by code N1 and code N2 are provided in the flow rate class table. In the code N1, the classes in the flow rate class table are grouped into four events of an area where it is determined that the flow rate is zero, an area where it is determined that the flow rate is stable (stable area), an area where it is determined that the flow rate increases (increase area), and an area where it is determined that the flow rate decreases (decrease area). As shown in the table, the four areas are associated with four digits of 0, 1, 2, and 3 and each can be represented by a two-bit code. That is, 0, 1, 2, and 3 can be represented as "00," "01," "10," and "11" respectively. Thus, the class is represented using the code rather than the conventional difference value, whereby a better affinity for a microcomputer program is ensured and the identification index can be provided in a small memory size and a small computation amount.

In the example, the area where it is determined that the flow rate is zero is named; in an actual apparatus, however, the actually measured flow rate has a slight variation and thus scarcely becomes complete zero. Therefore, the case where the flow rate becomes zero also contains the case where the flow rate becomes almost zero and the case where the flow rate substantially becomes zero.

The code N2 is generated by further subdividing each of the areas mentioned above; it is generated by subdividing the stable area into seven in response to the flow rate stability, the increase area into four in response to degree of the increase, and the decrease area into four in response to degree of the flow rate decrease. The area where it is determined that the flow rate is zero is not subdivided. Therefore, the code N2 can be represented by a four-bit code (0 to 9, A to F).

In the code N1, each area is subdivided having a different flow rate width. For example, in the increase area, the area where the difference flow rate is smaller is subdivided to a smaller flow rate width. For example, in the area of code "6," the difference flow rate width is 150-100=50 L/h; in the area of code "4," the flow rate width is 50-10=40 L/h; and in the area of code "3," the flow rate width is 10-1=9 L/h. Such a configuration is provided in view of the necessity for narrowing the flow rate width in small flow rates in order to enhance the identification accuracy, since many types of appliances are operated within areas where the difference flow rate is small.

The difference value conversion section 112 converts the difference value computed by the computation section 108 into the code representing the class into which the difference value at the predetermined time period (of ultrasonic wave transmission) is classified with reference to the flow rate class table 110a. The flow rate change history generation section 114 generates a flow rate change history approximately representing flow rate change of fluid based on a set of codes of the predetermined time period provided by the difference value conversion section 112, and records the history in memory not shown as required.

The appliance identification section 116 identifies the gas appliance using gas as a fluid based on the flow rate change history generated by the flow rate change history generation section 114. Here, the appliance identification section 116 makes a comparison between the flow rate change history and flow rate history information proper to each gas appliance previously stored in the appliance-specific flow rate history information retention section 118 for each gas appliance, and identifies the gas appliance using the gas based on the similarity of the appliances, etc.

An appliance-specific flow rate calculation section 120 can also calculate the flow rate for each gas appliance identified by the appliance identification section 116. The gas meter 100 is connected to a gas pipe 19 on the upstream side and is also connected to various gas appliances 13, 14, and 15, such as a gas table, a fan heater, and floor heating, on the downstream side.

A method of recording a flow rate change history using the gas meter 100 of the embodiment will be discussed below: To begin with, flow rate (actual flow rate) Q(n) measured at a given time interval (for example, two seconds, etc.,) by the ultrasonic flowmeter 104 and flow rate Q(n−1) previously measured are once stored in the measurement flow rate information storage section 106. Then, the computation section 108 computes difference value ΔQ(n)=Q(n)−Q(n−1), the difference between Q(n) and the previously measured flow rate Q(n−1). Here, the given interval may be four or six seconds.

The difference value conversion section 112 references the flow rate class table 110a in FIG. 2 and converts the difference value ΔQ(n) computed by the computation section 108 into the class code (four-bit code N1 or two-bit code N2) of the code presenting the class into which the difference value of the predetermined time period is classified. Here, selection of which class codes N1 or N2 is used can be made freely.

Figures 3A, 3B:
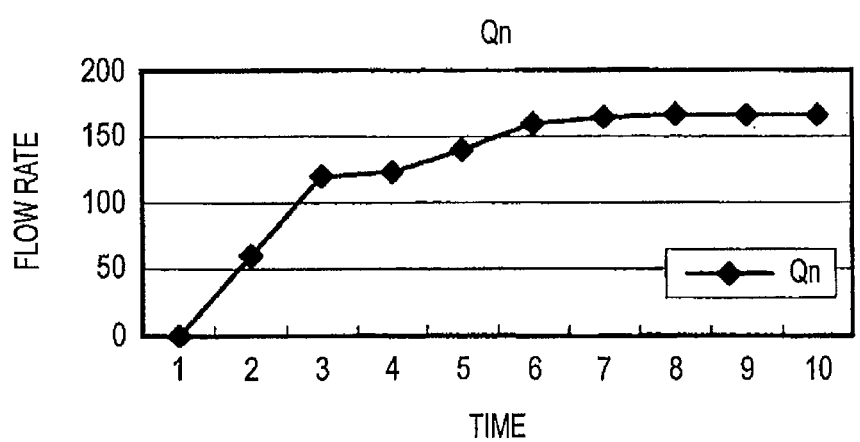
FIGS. 3A and 3B are drawings to show the concept of classifying difference values between flow rates with use of gas appliance A according to the flow rate class table.

FIG. 3 shows an example of conversion using such a flow rate class table. When a gas appliance A (for example, fan heater) corresponding to any of the gas appliance 13, 14, or 15 in FIG. 1 is started and a gas flow rate occurs, the measured flow rate becomes flow rate Q(n)≠0 from flow rate Q(n)=0 and the flow rate changes in response to the amount of used gas as shown in "FLOW RATE VALUE" in FIG. 3(a) and a graph in FIG. 3(b). At the same time as flow rate measurement of the ultrasonic flowmeter 104, the computation section 108 computes the difference value and the difference value conversion section 112 executes conversion to the class code N1 or the class code N2.

From the code provided by the conversion, the flow rate change history generation section 114 generates a flow rate change history corresponding to two-bit code or four-bit code of "CLASS CODE N1," "CLASS CODE N2" in FIG. 3(a). The flow rate change history of a set of codes of the predetermined time period approximately represents flow rate change of gas and the flow rate change history generation section 114 records the obtained flow rate change history in memory not shown as required.

That is, "CLASS CODE N1," "CLASS CODE N2" in FIG. 3(a) does not represent the flow rate itself unlike "FLOW RATE VALUE" in FIG. 3(a) and the graph in FIG. 3(b). However, such a code group mostly represents a change of the gas flow rate, namely, approximately represents four events of an area where it is determined that the flow rate is zero, an area where it is determined that the flow rate is stable, an area where it is determined that the flow rate increases, and an area where it is determined that the flow rate decreases; it is made possible to keep track of rough flow rate behavior change using the code group.

The flow rate change history of the code group described above can be easily handled because the memory size lessens while the information amount decreases as compared with a history made up of difference values in the related art. Therefore, various types of computation processing performed by an apparatus of a gas meter, etc., are facilitated and the necessary memory amount in the apparatus or any other part can be decreased. Memory size required to store the flow rate change history of the invention is small as compared with the history made up of difference values in the same measurement time in the conventional art. Accordingly, the flow rate change history of the invention can be easily handled as compared with the history made up of difference values in the conventional art even in a longer measurement time.

If such a code group, namely, the flow rate change history is proper to each gas appliance, it is made possible to identify the gas appliance using the gas.

Figures 4A, 4B:
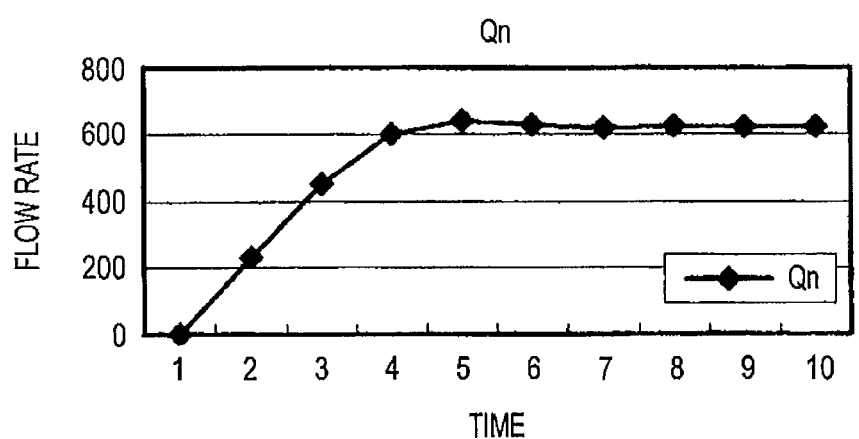
FIGS. 4A and 4B are drawings to show the concept of classifying difference values between flow rates with use of gas appliance B according to the flow rate class table.
Figure 7:
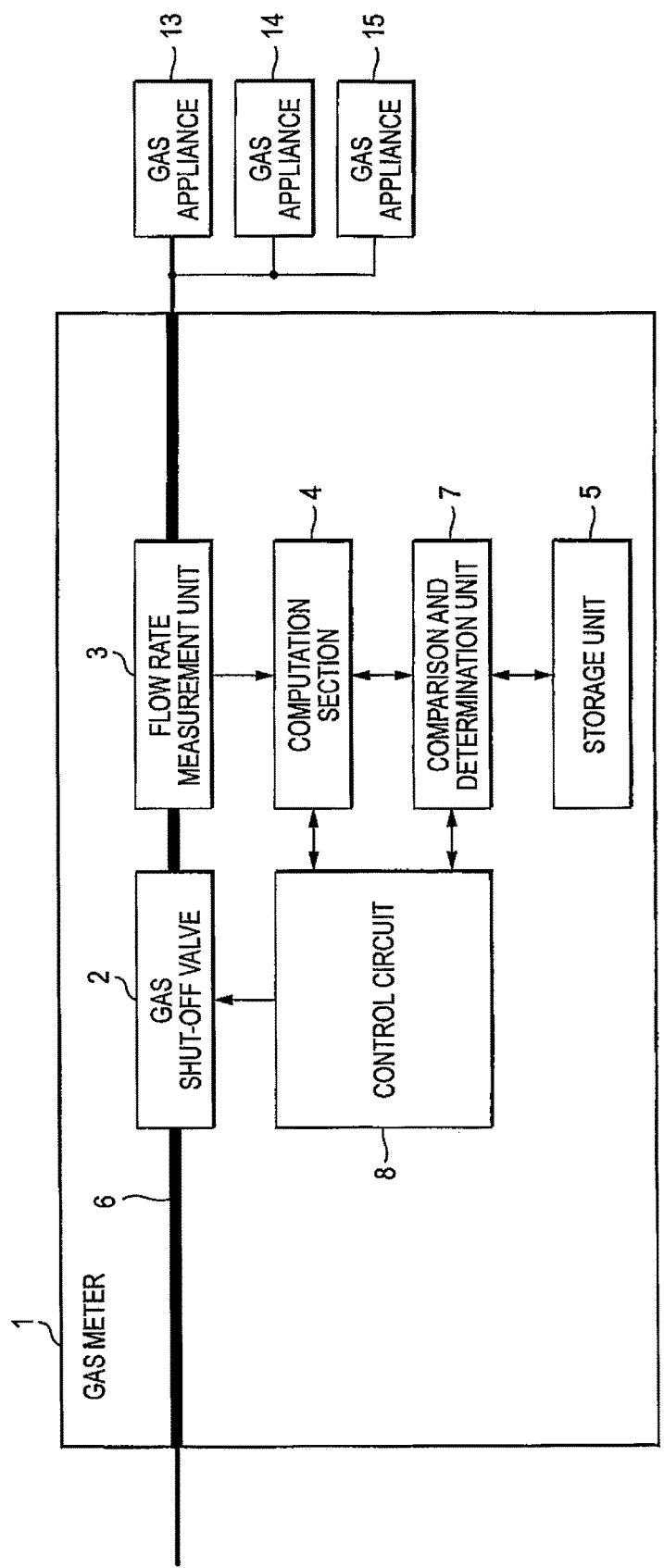
FIG. 7 is a block diagram of a gas meter in a related art.

Attention is focused on flow rate change to a predetermined time, for example, the third sampling (lapse of six seconds) since the gas use started. In the example of gas appliance A in FIG. 3, the class code N1 is "0553." On the other hand, the class code N1 of the gas flow rate to the third sampling becomes "0777" according to the gas flow rate after start of gas appliance B (for example, a water heater) shown in FIG. 4, provided in a similar manner.

Making a comparison between the code N1 of the gas appliance A and the code N1 of the gas appliance B, the gas appliance A rises along the flow rate change history of "0553" and the gas appliance B rises along the flow rate change history of "0777." The individual rising characteristic for each gas appliance is previously stored and if the class code N1 provided by measurement and conversion is "0553," it can be determined that the working gas appliance is the gas appliance A. If the provided class code N1 is "0777," it can be determined that the working gas appliance is the gas appliance B.

The appliance identification section 116 identifies the gas appliance using the gas according to the above-described method based on the flow rate change history generated by the flow rate change history generation section 114. Here, the appliance identification section 116 makes a comparison between the flow rate change history and the flow rate history information proper to each gas appliance previously stored in the appliance-specific flow rate history information retention section 118 for each gas appliance, and identifies the gas appliance using the gas from the similarity therebetween, etc. Although the rising characteristic of the gas appliance A, the gas appliance B, ... described above exists as the flow rate history information proper to each gas appliance, the information is not limited if it can be used to identify the gas appliance; a peculiar control characteristic during starting, stop-time characteristic, etc., can also be used. The flow rate history information proper to each gas appliance stored in the appliance-specific flow rate history information retention section 118 may be learned and corrected by actual flow rate measurement rather than preset.

As described above, memory size required to store the flow rate change history of the invention is small as compared with the history made up of difference values in the same measurement time in the conventional art. Accordingly, the flow rate change history of the invention can be easily handled as compared with the history made up of difference values in the conventional art even in a longer measurement time. A long-time flow rate change history is used, whereby the appliance identification accuracy can be improved.

FIG. 5 shows another example of the flow rate class table 110a. The classified actual values in the flow rate class table in FIG. 5 differ from those in the flow rate class table in FIG. 2. In the example of FIG. 2, 16 classes (N1) and 4 classes (N2) are provided in the range to the difference value 150 L/h; while, in the example in FIG. 5, likewise, 16 classes (N1) and 4 classes (N2) are provided in the range to a difference value of 30 L/h. Therefore, when a gas appliance with a small (actual) flow rate (a gas appliance with a small actual flow rate and also with a change width) starts, the table in FIG. 5 is used more preferably for identifying the gas appliance as compared with the table in FIG. 2. For example, when a gas appliance with flow rate Q(n)≥200 L/h is used, the table in FIG. 2 is used and when a gas appliance with flow rate Q(n)<200 L/h is used, the table in FIG. 5 is used, whereby the gas appliance can be identified precisely.

The classes in the flow rate class table (FIG. 2, FIG. 5) can be further subdivided, the codes in the increase area and the decrease area can be made the same in the code N1, and increase and decrease codes can be contained on the code N2 side, as in FIG. 6. Such a composition makes it possible to easily determine an increase or a decrease in the stable area and makes it possible to determine the change amount like an actual value.

To implement the flow rate measurement method as described above, programs for executing the steps of the method of recording the flow rate change history and the flow rate measurement method are stored in the appliance identification section 116 of the gas meter 100 and a computer (computing apparatus) not shown. The invention also contains a fluid supplying system also containing a supply source of a fluid (gas) using the method of recording the flow rate change history, the flow rate measurement apparatus, the flow rate measurement method, and the program for causing a computer to execute, of the invention.

Although the case where the ultrasonic flowmeter is used has been described, it is obvious that other instantaneous flow rate measurement apparatus using a sampling signal can also provide similar advantages. Although description of processing after the appliance identification is omitted, it is obvious that the gas meter can be also provided with an appliance-specific fee rate setting for each registered appliance or for each classified group that is determined by measuring the integrated flow rate as well as an appliance-specific security function setting for safety management (security function) processing for each registered appliance or for each classified group. If the gas meter and each gas appliance can be equipped with a transmission-reception unit such as a wireless apparatus, it is obvious that the appliance identification accuracy more improves. Further, although the embodiment of the invention has been described with the gas meter and the gas appliance, it can also be used for identifying the working appliance connected to the downstream side of the flow rate measurement apparatus and grouping the working appliances in a similar manner to that described above in an industrial flowmeter and a water meter.

In the code N1 of the classes in the flow rate class table described above (FIG. 2, FIG. 5, FIG. 6), the difference flow rate width in subdivided area varies from one another. However, it may be substantially equally subdivided at least in the increase area and the decrease area, of course.

In the embodiment described above, the difference value between the flow rates of gas of a fluid is coded. However, the object to be coded in the invention is not limited to the flow rate and can be grasped widely as physical quantity, such as temperature, pressure, or weight. For example, if the temperature (air temperature) is measured as the physical quantity, temperature change (air temperature change) over a long term can be recorded using a small memory amount and the temperature measurement can also be used for determining weather conditions and a season. Thus, the invention can be applied not only to the flow rate, but also to physical quantities widely.

While the embodiments of the invention have been described, it is to be understood that the invention is not limited to the items shown in the embodiments described above and the invention also intends that those skilled in the art make changes, modifications, and applications based on the Description and widely known arts, and the changes, the modifications, and the applications are also contained in the scope to be protected.

This application is based on Japanese Patent Application No. 2007-141167 filed on May 28, 2007, and Japanese Patent Application No. 2007-141168 filed on May 28, 2007, which are incorporated herein by reference.

INDUSTRIAL APPLICABILITY

As described above, according to the invention, the difference value is converted into a code easier to handle, so that when the identification art of the working appliance of a fluid is provided, it is made possible to improve the computing speed and the identification accuracy while decreasing the memory amount required for the apparatus, etc.

What is claimed is:

1. A method of identifying a type of gas appliance in use, comprising a computer and a memory that stores computer executable programs executed by the computer to implement:

measuring, at a first time interval, a flow rate of gas being consumed by the gas appliance in use;

generating a series of difference values from measurements of the flow rate measured during a predetermined time period, the series of difference values each calculated between a respective pair of measurements of flow rate, and the measurements in a respective pair being separated in time at a second time interval equal to or longer than the first time interval;

converting the series of difference values into a sequence of replacement codes with reference to a flow rate class table which is arranged to define classes each associated with a replacement code and each representative of a range of difference value, wherein the series of difference values are each replaced with a replacement code associated with a class to which the difference value belongs;

using the sequence of codes to generate a flow rate change history representing a flow rate change of gas consumed by the gas appliance in use during the predetermined time period;

comparing the generated flow rate change history with flow rate history information stored in advance in a storage in relation to a respective plurality of types of gas appliances, the flow rate history information being representative of a characteristic of gas consumption peculiar to a type of gas appliance; and identifying the type of gas appliance in use by finding a type of gas appliance from the storage whose flow rate history information accounts for a characteristic of gas consumption similar to the generated flow rate change of gas consumed by the gas appliance in use, wherein the classes in the flow rate class table comprise four event categories comprising (a) a category indicative of an event that the flow rate is substantially zero, (b) a category indicative of an event that the flow rate is stable and not zero, (c) a category that the flow rate is increasing, and (d) a category indicative of an event that the flow rate is decreasing.

2. The method of recording the flow rate change history as claimed in claim 1 wherein a plurality of flow rate class tables are provided which cover different ranges of the difference values.

3. The method of recording the flow rate change history as claimed in claim 1 wherein each of the event categories is subdivided according to one of a degree of stability of the flow rate, a degree of increase of the flow rate, and a degree of decrease of the flow rate.

4. The method of recording the flow rate change history as claimed in claim 1 wherein (a) the category indicative of the event that the flow rate is increasing and (b) the category indicative of the event that the flow rate is decreasing are each subdivided at equal intervals.

5. The method of recording the flow rate change history as claimed in claim 1 wherein (a) the category indicative of the event that the flow rate is increasing and the category indicative of the event that the flow rate is decreasing are each subdivided at different intervals.

6. The method of recording the flow rate change history as claimed in claim 2 wherein the plurality of flow rate class tables are switched under a predetermined condition.

7. A non-transitory computer readable medium containing a program for identifying a type of gas appliance in use, the program executed by a computer to implement:

measuring, at a first time interval, a flow rate of gas being consumed by the gas appliance in use;

generating a series of difference values from measurements of the flow rate measured during a predetermined time period, the series of difference values each calculated between a respective pair of measurements of the flow rate, and the measurements in a respective pair being separated in time at a second time interval equal to or longer than the first time interval;

converting the series of difference values into a sequence of replacement codes with reference to a flow rate class table which is arranged to define classes each associated with a replacement code and each representative of a range of difference value, wherein the series of difference values are each replaced with a replacement code associated with a class to which the difference belongs;

using the sequence of codes to generate a flow rate change history representing a flow rate change of gas consumed by the gas appliance in use during the predetermined time period;

comparing the generated flow rate change history with flow rate history information stored in advance in a storage in relation to a respective plurality of types of gas appliances, the flow rate history information being representative of a characteristic of gas consumption peculiar to a type of gas appliance; and identifying the type of gas appliance in use by finding a type of gas appliance from the storage whose flow rate history information accounts for a characteristic of gas consumption similar to the generated flow rate change of gas consumed by the gas appliance in use, wherein the classes in the flow rate class table comprise four event categories comprising (a) a category indicative of an event that the flow rate is substantially zero, (b) a category indicative of an event that the flow rate is stable and not zero, (c) a category that the flow rate is increasing, and (d) a category indicative of an event that the flow rate is decreasing.

8. A flow rate measurement apparatus comprising:

a flow rate measurement section that measures, at a first time interval, a flow rate of gas being consumed by a gas appliance in use;

a computation section that generates a series of difference values from measurements of the flow rate measured during a predetermined time period, the series of difference values each calculated between a respective pair of measurements of the flow rate, and the measurements in a respective pair being separated in time at a second time interval equal to or longer than the first time interval;

a storage that stores a flow rate class table which is arranged to define classes each associated with a replacement code and each representative of a range of difference value;

a difference value conversion section that converts the series of difference values into a sequence of replacement codes with reference to the flow rate class table, wherein the series of difference values are each replaced with a replacement code associated with a class to which the difference value belongs;

a flow rate change history generation section that uses the sequence of codes to generate a flow rate change history representing a flow rate change of gas consumed by the gas appliance in use during the predetermined time period; and an appliance identification section that:
compares the generated flow rate change history with flow rate history information stored in advance in a storage in relation to a respective plurality of types of gas appliances, the flow rate history information being representative of a characteristic of gas consumption peculiar to a type of gas appliance; and identifies the type of gas appliance in use by finding a type of gas appliance from the storage whose flow rate history information accounts for a characteristic of gas consumption similar to the generated flow rate change of gas consumed by the gas appliance in use, wherein the classes in the flow rate class table comprise four event categories comprising (a) area category indicative of an event that the flow rate is substantially zero, (b) a category indicative of an event that the flow rate is stable and not zero, (c) a category indicative of an event that the flow rate is increasing, and (d) a category indicative of an event that the flow rate is decreasing.

9. The flow rate measurement apparatus as claimed in claim 8 comprising a plurality of flow rate class tables which cover different ranges of the difference values.

10. The flow rate measurement apparatus as claimed in claim 8 wherein each of the event categories is subdivided according to one of a degree of stability of the flow rate stability, a degree of increase of the flow rate, and a degree of decrease of the flow rate.

11. The flow rate measurement apparatus as claimed in claim 8 wherein (a) the category indicative of the event that the flow rate is increasing and (b) the category indicative of the event that the flow rate is decreasing are each subdivided at equal intervals.

12. The flow rate measurement apparatus as claimed in claim 8 wherein (a) the category indicative of the event that the flow rate is increasing and (b) the category indicative of the event that the flow rate is decreasing are each subdivided at different intervals.

13. The flow rate measurement apparatus as claimed in claim 9 wherein the plurality of flow rate class tables are switched under a predetermined condition.

14. A fluid supplying system comprising the flow rate measurement apparatus as claimed in claim 8.

* * * * *